US009863533B2

(12) United States Patent
Takahashi et al.

(10) Patent No.: US 9,863,533 B2
(45) Date of Patent: Jan. 9, 2018

(54) CONTROL DEVICE FOR CONTINUOUSLY VARIABLE TRANSMISSION

(71) Applicants: JATCO Ltd, Fuji-shi, Shizuoka (JP); NISSAN MOTOR CO., LTD., Yokohama-shi, Kanagawa (JP)

(72) Inventors: Seiichiro Takahashi, Isehara (JP); Daisuke Aoki, Ebina (JP); Takahiro Kobayashi, Higashikurume (JP); Juwan Kim, Seoul (KR); Shinichiro Watanabe, Atsugi (JP); Yuta Suzuki, Sagamihara (JP)

(73) Assignees: JATCO Ltd, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 15/021,501

(22) PCT Filed: Oct. 17, 2014

(86) PCT No.: PCT/JP2014/077628
§ 371 (c)(1),
(2) Date: Mar. 11, 2016

(87) PCT Pub. No.: WO2015/060204
PCT Pub. Date: Apr. 30, 2015

(65) Prior Publication Data
US 2016/0223077 A1 Aug. 4, 2016

(30) Foreign Application Priority Data
Oct. 23, 2013 (JP) .................................. 2013-220422

(51) Int. Cl.
*F16H 61/662* (2006.01)
*F16H 9/18* (2006.01)
(Continued)

(52) U.S. Cl.
CPC ............. *F16H 61/662* (2013.01); *F16H 9/18* (2013.01); *F16H 61/6649* (2013.01);
(Continued)

(58) Field of Classification Search
CPC ............................................ F16H 2061/66222
See application file for complete search history.

(56) References Cited

U.S. PATENT DOCUMENTS 6,146,308 A * 11/2000 Taniguchi ............. F16H 37/022
475/211
7,815,545 B2 * 10/2010 Nakashima ........... B60W 10/02
477/138
2004/0220016 A1 11/2004 Ochiai et al.

FOREIGN PATENT DOCUMENTS

GB 2 077 373 A 12/1981
JP 2001-304388 A 10/2001
(Continued)

*Primary Examiner* — Mark A Manley
(74) *Attorney, Agent, or Firm* — Foley & Lardner LLP

(57) ABSTRACT

A control apparatus for a continuously variable transmission (1) that includes a belt-type continuously variable transmission mechanism (40) and friction engagement elements (32), (33) is disclosed. The control apparatus includes: an operation position detection section (65) configured to detect an operation position of a selection lever (50); a selection control section (60b) configured to execute a selection control for engaging the friction engagement elements (32), (33) from a time point at which a switching from a non-travel range to a travel range is detected; a determination section (60) configured to determine engagement states of the friction engagement elements (32, 33); and a pulley pressure control section (60c) configured to control a pulley pressure supplied to two pulleys (41), (42). A belt slippage during an engagement of clutches is suppressed while a load on an oil pump is reduced.

4 Claims, 4 Drawing Sheets

(51) Int. Cl.
 *F16H 61/664* (2006.01)
 *F16H 61/04* (2006.01)
 *F16H 61/12* (2010.01)
(52) U.S. Cl.
 CPC .................. *F16H 61/66272* (2013.01); *F16H 2061/0485* (2013.01); *F16H 2061/0488* (2013.01); *F16H 2061/1232* (2013.01); *F16H 2061/66222* (2013.01)

(56) References Cited

FOREIGN PATENT DOCUMENTS

| JP | 2004-263741 A | 9/2004 |
| JP | 2007-263130 A | 10/2007 |
| JP | 2009-221986 A | 10/2009 |

\* cited by examiner

CONTROL DEVICE FOR CONTINUOUSLY VARIABLE TRANSMISSION

TECHNICAL FIELD

The present invention relates to a control apparatus for a continuously variable transmission that is mounted in a vehicle.

BACKGROUND ART

Conventionally, a continuously variable transmission including a belt-type continuously variable transmission mechanism that includes a belt wound around a primary pulley and a secondary pulley has widely been adopted as an automatic transmission. This continuously variable transmission is provided with a forward clutch and a reverse brake (hereinafter, these will also simply be referred to as clutches) that are interposed between the continuously variable transmission mechanism and an engine, and engagement and disengagement (release) of the clutches are controlled in accordance with an operation of a selection lever (also called a shift lever) by a driver.

For example, in a case where the driver switches the selection lever from a P range or an N range (hereinafter referred to as a non-travel range) to a D range or an R range (hereinafter referred to as a travel range), a motion of the selection lever is transmitted to a manual valve by a physical interlocking mechanism or a physical and electrical interlocking mechanism. The manual valve is displaced to a position at which the manual valve communicates between a clutch source pressure and a piston oil chamber of the clutch, and the clutch is engaged when a hydraulic pressure is supplied to a piston oil chamber. In this way, an engine torque is transmitted to the continuously variable transmission.

An operation position of the selection lever is detected by an inhibitor switch, and an electrical signal that corresponds to the operation position is inputted to a controller. In a case where a switching of the selection lever from the non-travel range to the travel range is detected by the inhibitor switch, a control for gradually increasing a clutch instruction (command) pressure (hereinafter referred to as a selection control) is ordinarily carried out to engage the clutch.

However, there is a case where a deviation occurs between the output signal from the inhibitor switch and a communication state of the manual valve, which is caused by an assembling error, rattling, or the like of the interlocking mechanism between the selection lever and the manual valve. That is to say, there is a case where, despite a fact that a signal indicating that "the selection lever has been switched from the non-travel range to the travel range" is inputted from the inhibitor switch, the manual valve is brought into a state of being not completely displaced to a travel range position (hereinafter, such a state as described above is referred to as a "pseudo D state").

In a case where the driver assumes that the switching of the selection lever to the travel range has been completed and depresses an accelerator in such a pseudo D state as described above, the clutch is actually not engaged, and thus an engine speed is rapidly increased by an operation of the accelerator. In a case where the manual valve is displaced to the travel range position in this state and is brought into the communication state with an oil passage for achieving the travel range, the clutch is engaged, and a torque is instantaneously inputted to the belt of the continuously variable transmission. In this case, a pulley oil (hydraulic) pressure (primary pressure and secondary pressure) for transmitting a torque becomes insufficient and there is a possibility that a belt slippage occurs.

A technique for suppressing the belt slippage by lowering the torque that is inputted to the pulley in a case where the pseudo D state is generated and the engine speed is rapidly increased as described above has been proposed. For example, a patent document 1 discloses a configuration of lowering the clutch instruction (command) pressure to be lower than that during the ordinary selection control and of limiting the engine output in a case where a racing of the engine occurs in the pseudo D state. With such a configuration, the engine output is promptly restricted during a non-engagement of the clutch, so as to be able to suppress the racing of the engine, an engagement shock of the clutch, and the belt slippage.

By the way, it is considered that, in a case where the driver slowly operates the selection lever from the non-travel range to the travel range, the pseudo D state, in which the deviation occurs between the output signal from the inhibitor switch and the communication state of the manual valve, is likely to be generated and, furthermore, this state continues. At this time, the engine speed is rapidly increased if the driver depresses an accelerator pedal. Thus, the belt slippage and the like can be suppressed by using the technique of the above-described patent document 1.

However, in a case where the selection lever is slowly operated and a time difference is present between a time at which the pseudo D state is generated and a time at which the pseudo D state is determined, the clutch instruction (command) pressure is, ordinarily, gradually increased according to the selection control. In this state, when the manual valve brings the oil passage for achieving the travel range into the communication state, an actual clutch pressure is rapidly increased to the clutch instruction (command) pressure and, thus, the clutch is rapidly engaged. Accordingly, the torque is instantaneously inputted to the belt of the continuously variable transmission and there is a possibility that the belt slippage occurs due to a shortage of the pulley pressure.

To handle this, it is considered to maintain the pulley pressure in a high state previously, in order to suppress the instantaneous torque inputted to the belt of the continuously variable transmission and occurrence of the belt slippage. However, this leads to an increase in a load on an oil pump for supplying the hydraulic pressure. In addition, in a case where this oil pump is driven by the engine, this also leads to a degradation of a fuel economy (consumption). Thus, a reduction in the load on the oil pump is desired.

PRE-PUBLISHED DOCUMENT

Patent Document

Patent document 1: A Japanese Patent Application First Publication (tokkai) No. 2009-221986.

DISCLOSURE OF THE INVENTION

One of objects of the present application is to provide a control apparatus for a continuously variable transmission that is created in view of a problem as described above and that can suppress a belt slippage during an engagement of a clutch while a load on an oil pump is reduced. It should be noted that the present application is not limited to this object, and to exhibit an operational effect that is led by each configuration in an embodiment described below, that is to say, an operational effect that cannot be obtained by the conventional technique can also be served as another object of the present application.

(1) A control apparatus for a continuously variable transmission disclosed herein is a control apparatus for a continuously variable transmission, the continuously variable transmission including: a continuously variable transmission mechanism having a belt wound around two pulleys; and a friction engagement element interposed between the continuously variable transmission mechanism and an engine, and the control apparatus includes: operation position detection means for detecting an operation position of a selection lever; selection control means for executing a selection control for engaging the friction engagement element from a time point at which a switching from a non-travel range to a travel range is detected by the operation position detection means; determination means for determining an engagement state of the friction engagement element; and pulley pressure control means for controlling a pulley pressure supplied to the two pulleys.

The pulley pressure control means increases the pulley pressure in a case where the determination means determines that the friction engagement element is released at a time point at which a predetermined time elapses from a start of the selection control by the selection control means and lowers the pulley pressure in a case where the determination means, thereafter, determines that the friction engagement element is engaged.

(2) The pulley pressure control means preferably increases the pulley pressure in accordance with a degree of progress of the selection control by the selection control means. Here, the selection control is preferably provided with plural control modes that are switched along with a lapse of time, and the degree of progress of the selection control corresponds to which control mode of the plural control modes is executed.

(3) When raising (increasing) the pulley pressure, the pulley pressure control means preferably increases the pulley pressure by a predetermined quantity to a hydraulic pressure at which a slippage of the belt does not occur during the engagement of the friction engagement element.

(4) The determination means preferably determines the engagement state of the friction engagement element by using a turbine rotational speed of a torque converter interposed between the friction engagement element and the engine.

According to the control apparatus for the continuously variable transmission disclosed herein, the pulley pressure is increased in a case where the friction engagement element is released even when a predetermined time elapses from a start of the selection control. Thus, a belt slippage that is caused by a rapid engagement of the friction engagement element can be suppressed. In addition, the pulley pressure is lowered when the friction engagement element is engaged. Thus, a load on the oil pump can be reduced. Therefore, in a case where the oil pump uses the engine as a drive source, a fuel economy (consumption) performance can be increased by reducing the load on the oil pump.

EMBODIMENTS FOR CARRYING OUT THE INVENTION

An embodiment of the invention will, hereinafter, be described with reference to the drawings. It should be noted that the embodiment described below is merely illustrative and has no intention of eliminating application of various modifications and techniques that are not clearly specified in the following embodiment. Each configuration of the embodiment below can be implemented while various modifications are made thereto within a scope that does not depart from the gist thereof, can selectively be adopted or eliminated upon necessary, or can appropriately be combined.

[1. Overall System Configuration]

Figure 1:
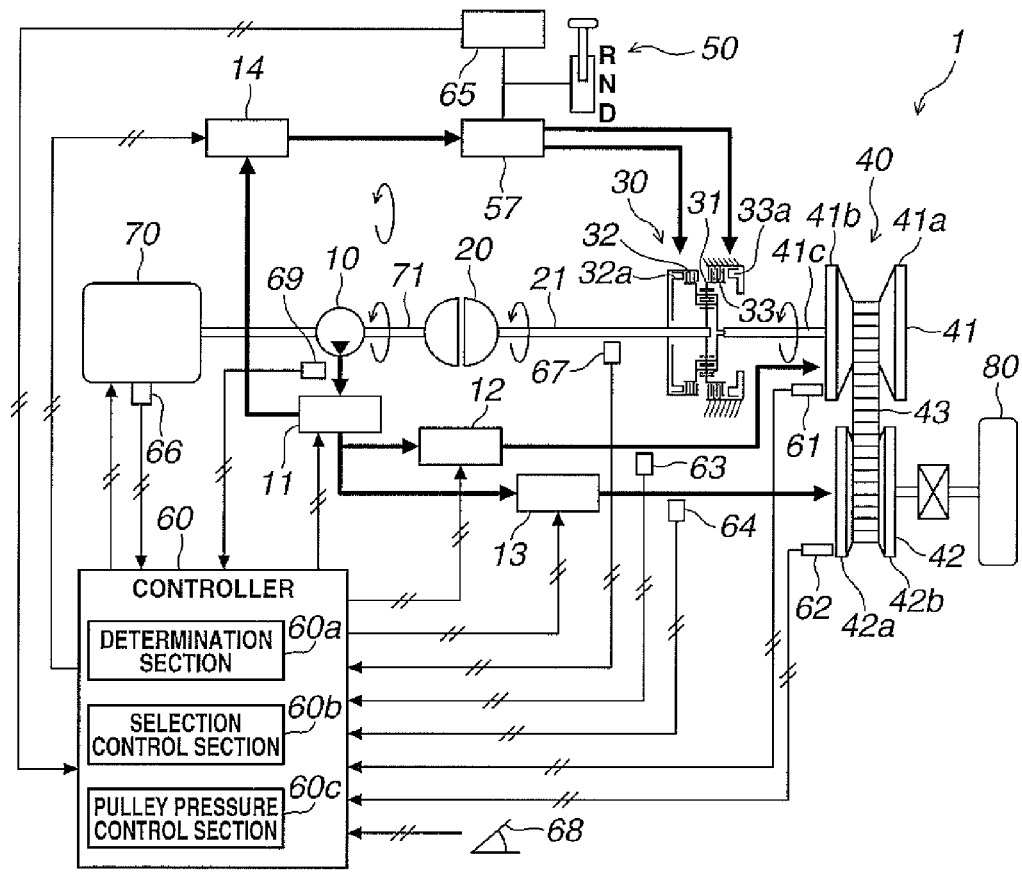
FIG. 1 is an overall system configuration that represents a drive train and a control system of an engine vehicle to which a control apparatus for a continuously variable transmission according to one embodiment is applied.

FIG. 1 is an overall system configuration that represents a drive train and a control system of an engine vehicle to which a control apparatus for a continuously variable transmission according to this embodiment is applied.

As shown in FIG. 1, the vehicle has an engine (internal combustion engine) 70 as a drive source and includes an oil pump 10, a torque converter 20, a forward-reverse travel switching mechanism 30, a belt-type continuously variable transmission mechanism 40, a final reduction mechanism (not shown), and a drive wheel 80. It should be noted that a belt-type continuously variable transmission 1 (hereinafter referred to as a CVT1) is configured by housing the torque converter 20, the forward-reverse travel switching mechanism 30, the belt-type continuously variable transmission mechanism 40, and the final reduction mechanism in a transmission casing.

The oil pump 10 is a mechanical pump that uses the engine 70 as a drive source and supplies oil under a pressure to a hydraulic pressure circuit. In the hydraulic pressure circuit, oil pressure (hydraulic pressure) regulators, such as a line pressure regulator 11, a primary pressure regulator 12, a secondary pressure regulator 13, and a clutch pressure regulator 14, and a manual valve 57 are interposed. The line pressure regulator 11 regulates oil that is pressure-fed (supplied under a pressure) from the oil pump 10 to line pressure PL that corresponds to a line instruction (command) pressure. The regulated line pressure PL is fed (supplied) to the primary pressure regulator 12, the secondary pressure regulator 13, and the clutch pressure regulator 14.

The primary pressure regulator 12 regulates the line pressure PL to primary pressure Ppri that corresponds to primary instruction (command) pressure. The secondary pressure regulator 13 regulates the line pressure PL to secondary pressure Psec that corresponds to secondary instruction (command) pressure. The clutch pressure regulator 14 regulates the line pressure PL to a forward clutch pressure Pfc or a reverse brake pressure Prb that respectively corresponds to a forward clutch instruction (command)

pressure or a reverse brake instruction (command) pressure. It should be noted that each of the line instruction (command) pressure, the primary instruction (command) pressure, the secondary instruction (command) pressure, the forward clutch instruction (command) pressure, and the reverse brake instruction (command) pressure are outputted from a controller 60, as will be described below.

The torque converter 20 is a starting element that has a torque increasing function, and has a lockup clutch (not shown) that can directly couple an engine output shaft (=torque converter input shaft) 71 and a torque converter output shaft 21 when the torque increasing function is unnecessary. This torque converter 20 has, as components: a pump impeller coupled, via a converter housing, which are not shown, to the engine output shaft 71; a turbine liner coupled to the torque converter output shaft 21; and a stator provided in a casing via a one-way clutch.

The forward-reverse travel switching mechanism 30 is a mechanism that switches an input rotational direction to the belt-type continuously variable transmission mechanism 40 between an ordinary rotation direction during a forward travel and a reverse rotation direction during a reverse travel. This forward-reverse travel switching mechanism 30 includes: a double-pinion type planetary gear 31 that switches between power transmission passages on the engine 70 side and the belt-type continuously variable transmission mechanism 40 side; a forward clutch 32 (a forward-side friction engagement element) formed of plural clutch plates; and a reverse brake 33 (a reverse-side friction engagement element) formed of plural brake plates.

The forward clutch 32 is connected to a forward clutch piston chamber 32*a*, and is engaged with the planetary gear 31 by a forward clutch pressure Pfc that is supplied to the forward clutch piston chamber 32*a* when a forward travel range such as a D range (a drive range) is selected (when the vehicle travels in a forward direction). The reverse brake 33 is connected to a reverse brake piston chamber 33*a* and is engaged with the planetary gear 31 by the reverse brake pressure Prb that is supplied to the reverse brake piston chamber 33*a* when an R range as a reverse travel range is selected (when the vehicle travels in a reverse direction). It should be noted that the forward clutch pressure Pfc and the reverse brake pressure Prb are fed to each of the piston chamber 32*a* and the piston chamber 33*a* via the manual valve 57 after being regulated (in pressure) by the clutch pressure regulator 14.

Hereinafter, the D range and the R range are collectively referred to as a "travel range". It should be noted that the forward clutch 32 and the reverse brake 33 (hereinafter simply referred to as the clutches 32, 33) are disengaged (released) by respectively draining the forward clutch pressure Pfc and the reverse brake pressure Prb when a neutral position such as an N range (a neutral range) or a P range (a parking range) is selected. Hereinafter, the N range and the P range are collectively referred to as a "non-travel range".

The belt-type continuously variable transmission mechanism 40 includes a continuously variable transmission function of continuously changing a speed change ratio (transmission gear ratio) that is a ratio between a transmission input rotational speed and a transmission output rotational speed (that is to say, the transmission input rotational speed/the transmission output rotational speed) by changing a belt contact diameter and has a primary pulley 41, a secondary pulley 42, and a belt 43. The primary pulley 41 is an input-side pulley to which a drive power of the engine 70 is inputted, and the secondary pulley 42 is an output-side pulley that transmits the drive power transmitted by the belt 43 to the drive wheel 80 via an idler gear or a differential gear.

The primary pulley 41 and the secondary pulley 42 respectively have: fixed conical plates 41*a*, 42*a*; movable conical plates 41*b*, 42*b* that are arranged in a state where sheave surfaces face these fixed conical plates 41*a*, 42*a* and that respectively form V grooves with the fixed conical plates 41*a*, 42*a*; and oil pressure cylinders (not shown). The hydraulic pressure cylinders are respectively provided on back surfaces of the movable conical plates 41*b*, 42*b* and are respectively supplied with the primary pressure Ppri and the secondary pressure Psec. The movable conical plates 41*b*, 42*b* move axially by the primary pressure Ppri and the secondary pressure Psec, respectively. A winding radius of the belt 43 around the primary pulley 41 and the secondary pulley 42 is changed in accordance with axial movement of the movable conical plates 41*b*, 42*b*, and thereby the speed change ratio (transmission gear ratio) is continuously (steplessly) changed.

The vehicle includes a controller 60 that controls the forward clutch pressure Pfc, the secondary pressure Psec, and the like as the control system of the CVT 1. The controller 60 is a computer that includes: a CPU for executing various computation processes; a ROM that stores so a program and data required for control thereof; a RAM that temporarily stores a computation result by the CPU and the like; an input/output port for inputting/outputting a signal to/from the outside; a timer for counting time; and the like.

Various types of sensors, such as a primary rotational speed sensor 61, a secondary rotational speed sensor 62, a primary pressure sensor 63, a secondary pressure sensor 64, an inhibitor switch (operation position detection means) 65, an engine speed sensor 66, a turbine rotational speed sensor 67, an accelerator operation quantity sensor 68, and a line pressure sensor 69, are connected to the controller 60, and sensor information and switch information that are detected by these sensors are inputted thereto. It should be noted that the turbine rotational speed sensor 67 detects a rotational speed of the torque converter output shaft 21 (that is, a turbine rotational speed Nt).

In addition, a selection lever (also called a shift lever) 50 for switching (selecting) a travel mode is provided in the vehicle. An inhibitor switch 65 detects an operation position of this selection lever 50 and outputs a range position signal that corresponds to a range position (the D range, the N range, the R range, or the like) selected by the selection lever 50.

Figure 2:
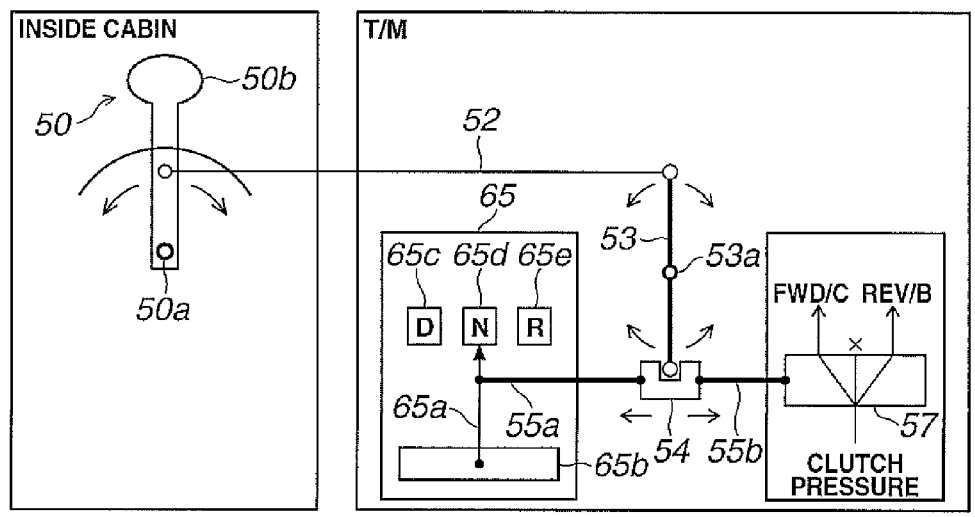
FIG. 2 is a schematic view that exemplifies a configuration of the transmission.

Here, a schematic view that exemplifies a configuration of the transmission is shown in FIG. 2. As shown in FIG. 2, the selection lever 50 can freely pivot about a fulcrum 50*a*, and one end of a wire 52 is connected to an operation section 50*b* side thereof from the fulcrum 50*a*. The other end of this wire 52 is connected to a link 53. The link 53 can freely pivot about a fulcrum 53*a*, and the other end thereof is connected to a slider 54. The slider 54 is coupled to a switch section 65*a* of the inhibitor switch 65 via a coupling rod 55*a*. The switch section 65*a* allows conduction between any one terminal of a D range terminal 65*c*, an N range terminal 65*d*, and an R range terminal 65*e* and a power supply terminal 65*b*.

When the selection lever 50 is operated by the driver as indicated by arrows, the link 53 pivots like arrows via the wire 52, and the slider 54 moves like arrows. The switch section 65*a* moves in conjunction with movement of this slider 54 and causes the conduction between the power supply terminal 65*b* and any one terminal of the D range terminal 65*c*, the N range terminal 65*d*, and the R range terminal 65*e*.

In addition, the slider 54 is coupled to the manual valve 57 via a coupling rod 55*b* that differs from the above coupling rod 55*a*. In other words, movement of the selection lever 50 is transmitted to the manual valve 57 by physical interlocking mechanisms (the wire 52, the link 53, the slider 54, and the coupling rod 55*b*). That is, when the selection lever 50 is operated, the link 53 pivots via the wire 52, and the slider 54 moves.

The manual valve 57 is displaced along with the movement of this slider 54 and, as shown in FIG. 1, brings the clutch pressure regulator 14 and an oil passage that leads to the forward clutch piston chamber 32*a* (FWD/C) or the reverse brake piston chamber 33*a* (REV/B) into a communication state. In this way, the forward clutch pressure Pfc or the reverse brake pressure Prb that is regulated by the clutch pressure regulator 14 is supplied to an oil passage that achieves the D range or an oil passage that achieved the R range, and the engagement and disengagement (release) of the forward clutch 32 or the reverse brake 33 are thereby controlled.

As specific control targets of the controller 60, a line pressure control for outputting an instruction (command) to obtain target line pressure corresponding to a throttle opening angle or the like to the line pressure regulator 11, speed change oil pressure control for outputting an instruction (command) to obtain a target speed change ratio (transmission gear ratio) in accordance with a vehicle speed, the throttle opening angle, or the like to the primary pressure regulator 12 and the secondary pressure regulator 13, forward-reverse travel switching control for outputting an instruction (command) to control the engagement/disengagement (release) of the forward clutch 32 and the reverse brake 33 to the clutch pressure regulator 14, and the like are listed.

In this embodiment, in the forward-reverse travel switching control, the selection control that is executed at a time when the selection lever 50 is switched from the non-travel range to the travel range will first be described and the pulley pressure control will next be described. In addition, in the speed change oil pressure control, the pulley pressure control that is executed in a case where the selection lever 50 is slowly and operatively switched from the non-travel range to the travel range will be described in details.

[2. Overview of Control]

[2-1. Selection Control]

The selection control is a control to fill the hydraulic pressure in the forward clutch piston chamber 32*a* or the reverse brake piston chamber 33*a* so as to engage the forward clutch 32 or the reverse brake 33 in a case where the switching of the selection lever 50 from the non-travel range to the travel range is detected by the inhibitor switch 65.

For example, in a case where the switching from the N range to the D range is carried out, a forward clutch pressure instruction (command) pressure (hereinafter simply referred to as clutch instruction (command) pressure) is controlled, and the forward clutch pressure Pfc that corresponds to the clutch instruction (command) pressure is regulated by the clutch pressure regulator 14. Then, when the manual valve 57 brings the clutch pressure regulator 14 and the oil passage for achieving the D range into the communication state, the forward clutch pressure Pfc is supplied to the forward clutch piston chamber 32*a* and the forward clutch 32 is engaged.

The selection control includes: an ordinary selection control that is carried out in a case where a signal of the inhibitor switch 65 (hereinafter referred to as an INH signal) is coincident with the communication state of the manual valve 57; and a pseudo D selection control that is carried out in a case where the INH signal is not coincident with the communication state of the manual valve 57. In addition, each of these two types of the selection control is provided with four control modes that are a low-pressure filling mode as a first control mode, a capacity control mode as a second control mode, an engagement assurance mode as a third control mode, and an ordinary capacity control mode as a fourth control mode, and the clutch instruction (command) pressure is controlled in accordance with each of the modes.

It should be noted that a case where the INH signal matches (is coincident with) the communication state of the manual valve 57 refers to a case where the manual valve 57 brings the clutch pressure regulator 14 and the oil passage for achieving the D range into the communication state in a case where the INH signal is a range position signal that corresponds to the D range, for example. On the contrary, a case where the manual valve 57 does not bring the clutch pressure regulator 14 and the oil passage for achieving the D range into the communication state in a case where the INH signal is the range position signal that corresponds to the D range refers to a case where the INH signal does not match (is not coincident with) the communication state of the manual valve 57.

The pseudo D selection control is executed in a case where the driver slowly operates the selection lever 50 from the non-travel range to the travel range. That is to say, when the selection lever 50 is positioned between the non-travel range and the travel range, the manual valve 57 is brought into a state of not completely displaced (not completely switched to the travel range) despite a fact that the output signal of the inhibitor switch 65 indicates the travel range. Then, there is a possibility that a deviation occurs between the INH signal and the communication state of the manual valve 57. The pseudo D selection control is executed in this case.

Figure 4:
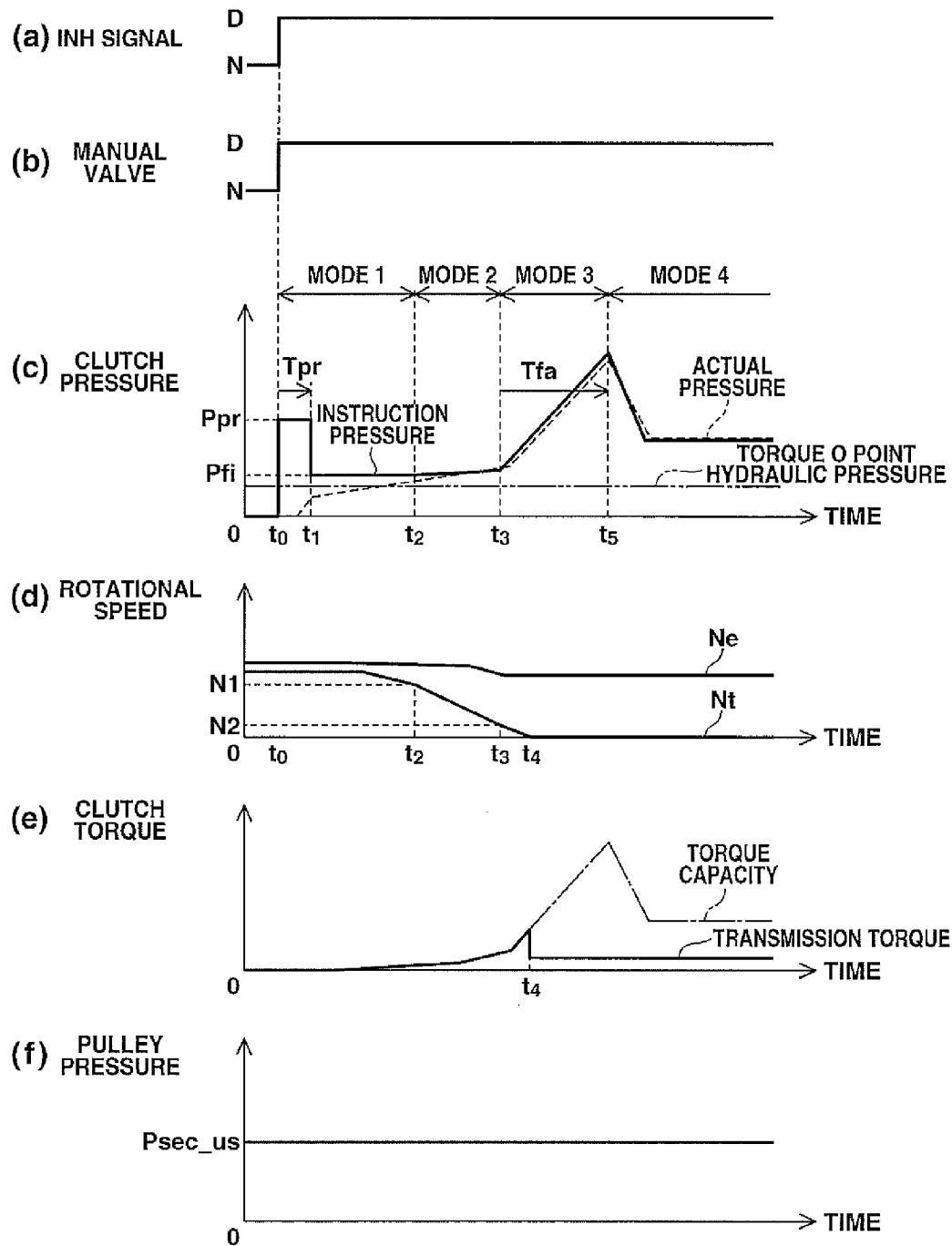
FIG. 4 is a timing chart in a case where the ordinary selection control is selected, in which (a) indicates an INH (inhibitor) signal, (b) indicates a manual valve, (c) indicates a clutch pressure, (d) indicates a rotational speed, (e) indicates a clutch torque, and (f) indicates a pulley pressure.

First, the ordinary selection control will be described by using a timing chart shown in FIG. 4. It should be noted that a mode 1, a mode 2, a mode 3, and a mode 4 in FIG. 4(*c*) and FIG. 5(*c*), which will be described below, respectively correspond to the first control mode, the second control mode, the third control mode, and the fourth control mode. As shown in FIGS. 4(*a*) to (*d*), the first control mode (a low-pressure filling mode) is started at a time point (time $t_0$) at which the INH signal is switched from the N range (the non-travel range) to the D range (the travel range).

In the first control mode, the clutch instruction (command) pressure is first increased in a stepwise manner to pre-charge pressure Ppr and is maintained until a predetermined pre-charge time Tpr elapses. In this way, an invalid stroke of the forward clutch piston is promptly reduced. It should be noted that the pre-charge time Tpr is set to a time duration of such a degree that is required for the invalid stroke of the forward clutch piston to become zero and for the forward clutch 32 not to transmit torque in a case where the pre-charge pressure Ppr is supplied to the forward clutch piston chamber 32*a*, for example.

At a time $t_1$ at which the invalid stroke of the forward clutch piston is reduced, the clutch instruction (command) pressure is lowered to a predetermined pressure Pfi that is slightly higher than torque 0 point hydraulic pressure. It should be noted that the torque 0 point hydraulic pressure is a hydraulic pressure at which the forward clutch 32 can be retained in a contact state of such a degree that the torque is not transmitted. The engagement of the forward clutch 32 is gradually started by increasing the clutch instruction (command) pressure. Since the drive wheel 80 is stopped at this time, the turbine rotational speed Nt starts being decreased in conjunction with a degree of progress of the engagement of the forward clutch 32.

Then, the control mode is switched from the low-pressure filling mode to the capacity control mode at a time point (time $t_2$) at which the turbine rotational speed Nt reaches an engagement start determination threshold N1. It should be noted that the engagement start determination threshold N1 is a speed threshold for determining whether the engagement of the forward clutch 32 is started and is preset to a rotational speed that is decreased by a predetermined rotational speed from the turbine rotational speed Nt at a time when the INH signal is switched from the N range to the D range. In other words, the low-pressure filling mode of the ordinary selection control is a control mode that is executed in a period from a time point that the INH signal is switched from the N range to the D range until the turbine rotational speed Nt reaches the engagement start determination threshold N1.

In the second control mode (the capacity control mode), the clutch instruction (command) pressure is increased from the predetermined pressure Pfi in a ramp shape with a small inclination and the engagement of the forward clutch 32 is progressed. It should be noted that the forward clutch 32 is rapidly engaged when the forward clutch pressure Pfc is excessively high. Thus, the forward clutch pressure Pfc is controlled here to oil pressure that is slightly higher than the clutch instruction (command) pressure in the first control mode. Then, the control mode is switched from the second control mode to the third control mode at a time point (time $t_3$) at which the turbine rotational speed Nt reaches an engagement completion determination threshold N2.

It should be noted that the engagement completion determination threshold N2 is a smaller value than the above-described engagement start determination threshold N1 (N1>N2), is a threshold speed for determining whether the forward clutch 32 is engaged, and is preset to such a rotational speed that a deviation between the turbine rotational speed Nt and an engine speed Ne falls within a predetermined value, for example. In other words, the capacity control mode of the ordinary selection control is a control mode that is executed in a period from a time point at which the turbine rotational speed Nt reaches the engagement start determination threshold N1 until the turbine rotational speed Nt reaches the engagement completion determination threshold N2.

In the third control mode (the engagement assurance mode), the clutch instruction (command) pressure is increased in the ramp shape with a predetermined inclination for a predetermined assurance time Tfa. In this way, the forward clutch 32 is completely engaged (a time $t_4$). The third control mode of the ordinary selection control is executed for the assurance time Tfa from a time point at which the turbine rotational speed Nt reaches the engagement completion determination threshold N2, and the control mode is switched from the third control mode to the fourth control mode at a time $t_5$. In the fourth control mode (the ordinary capacity control mode), the clutch instruction (command) pressure is controlled to be lowered in the ramp shape and become a predetermined hydraulic pressure.

Figure 5:
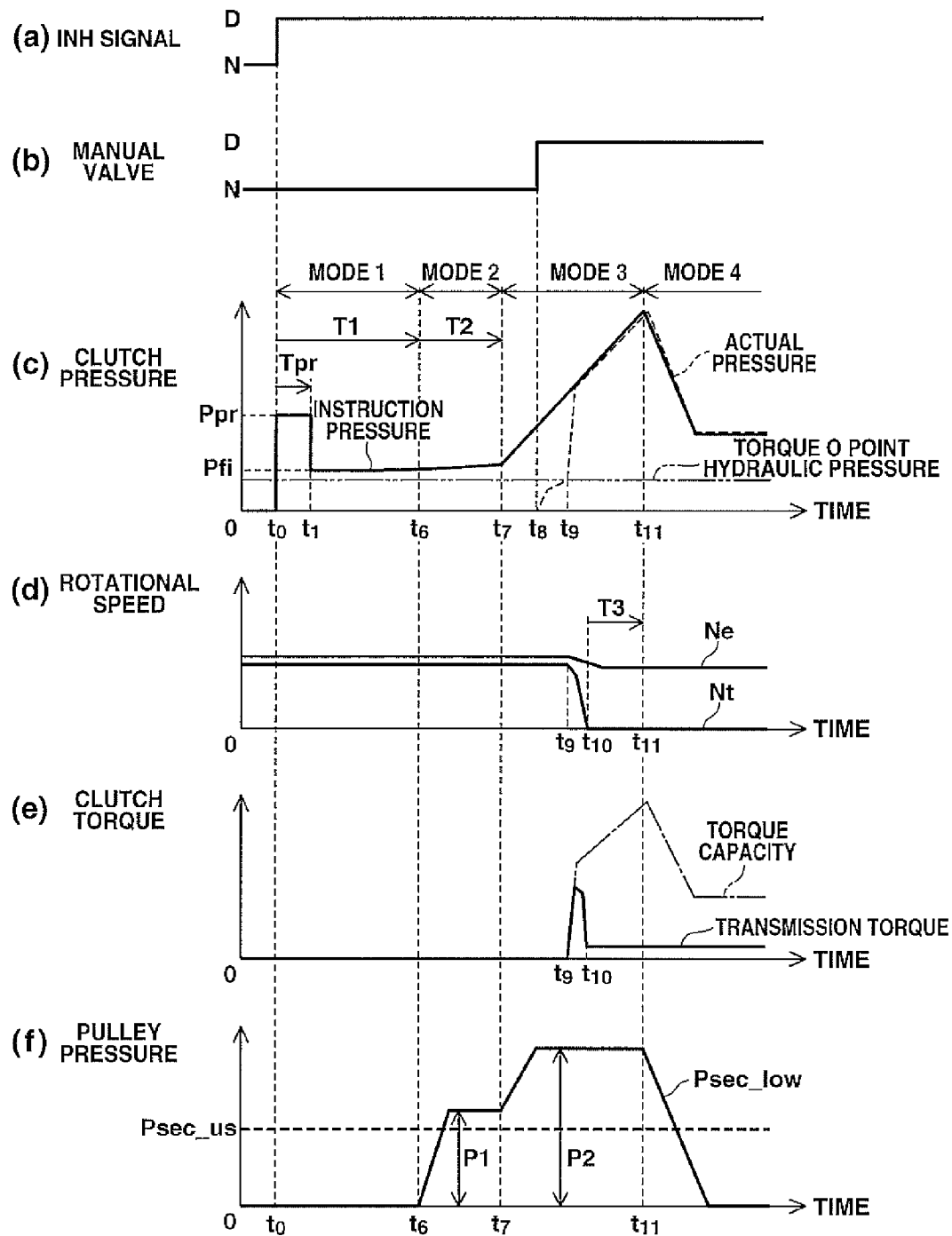
FIG. 5 is a timing chart in a case where the pseudo D selection control is selected, in which (a) indicates the INH signal, (b) indicates the manual valve, (c) indicates the clutch pressure, (d) indicates the rotational speed, (e) indicates the clutch torque, and (f) indicates the pulley pressure.

Next, the pseudo D selection control will be described by using a timing chart shown in FIG. 5. As shown in FIGS. 5(a) to (d), the first control mode (the low-pressure filling mode) is started from the time point (the time $t_0$) at which the INH signal is switched from the N range to the D range. The first control mode is similar to that of the ordinary selection control. However, in this case, the manual valve 57 is not completely switched from a state corresponding to the N range to a state corresponding to the D range and, thus, does not completely bring the clutch pressure regulator 14 and the oil passage for achieving the D range into the communication state. Thus, the oil pressure is hardly supplied to the forward clutch piston chamber 32a. For this reason, the progress of the engagement of the forward clutch 32 is delayed and, thus, the turbine rotational speed Nt hardly changes.

In view of the above, in a case where the turbine rotational speed Nt does not change at a time point (time $t_6$) at which a first predetermined time T1 elapses from a start of the first control mode, the control mode is switched from the first control mode to the second control mode at this time point. This first predetermined time T1 is set to a longer time than a time that is required for the turbine rotational speed Nt to reach the engagement start determination threshold N1 in a case where the INH signal matches (is coincident with) the communication state of the manual valve 57.

In other words, the control of the clutch instruction (command) pressure in the first control mode is executed from the time point at which the INH signal is switched from the N range to the D range. The ordinary selection control is selected in a case where the turbine rotational speed Nt reaches the engagement start determination threshold N1 in a period from the start of the first control mode until the first predetermined time T1 elapses. The pseudo D selection control is selected in a case where the turbine rotational speed Nt does not change even after the first predetermined time T1 elapses.

In the second control mode (the capacity control mode) of the pseudo D selection control, the clutch instruction (command) pressure is increased in the ramp shape. The control mode is switched from the second control mode to the third control mode at a time point (time $t_7$) at which a second predetermined time T2 elapses from the time point (the time $t_6$) at which the control mode is switched from the first control mode to the second control mode.

In the third control mode (the engagement assurance mode) of the pseudo D selection control, the clutch instruction (command) pressure is increased in the ramp shape. The third control mode is executed from a time point at which the engagement of the forward clutch 32 is completed, that is, a time point (time $t_{10}$) at which the deviation between the turbine rotational speed Nt and the engine speed Ne becomes equal to or higher than a predetermined rotation speed until a third predetermined time T3 elapses. Thereafter, the control mode is switched to the fourth control mode. It should be noted that the third predetermined time T3 is set in an equivalent manner to the assurance time Tfa.

It should be noted that, in a case where the communication state of the manual valve 57 is switched to that in the D range during the second control mode of the pseudo D selection control, the engagement of the forward clutch 32 is started and the turbine rotational speed Nt starts being decreased. Thus, in this case, the second control mode of the pseudo D selection control is shifted to the second control mode of the ordinary selection control. That is, when the turbine rotational speed Nt reaches the engagement completion determination threshold N2, the third control mode of the ordinary selection control is executed from the time point for the assurance time Tfa.

In the fourth control mode (the ordinary capacity control mode), the clutch pressure is controlled to be lowered in the ramp shape and become the predetermined hydraulic pressure.

It should be noted that, in a case where the engagement of the forward clutch 32 is not started, in the third control mode, it is determined as a pseudo D state. The clutch instruction (command) pressure is lowered to become lower than that in the ordinary selection control, and the engine output is restricted.

In addition, the description has been made here on the selection control in a case where the selection lever 50 is switched from the N range to the D range. However, the similar selection control is executed in a case where the selection lever 50 is switched from the P range to the D range. Furthermore, in a case where the selection lever 50 is switched from the N range or the P range to the R range, the selection control for engaging the reverse brake 33 is executed. In this selection control, the reverse brake instruction (command) pressure is controlled in the similar manner as described above.

[2-2. Pulley Pressure Control]

The pulley pressure control is a control related to the primary pressure Ppri and the secondary pressure Psec (hereinafter, these will collectively be referred to as a pulley pressure) and is executed in a case where the selection control is executed. The pulley pressure control is executed in accordance with the selected selection control (that is, the ordinary selection control or the pseudo D selection control). Furthermore, in a case where the pseudo D selection control is selected, the pulley pressure is controlled in accordance with the control mode.

Here, a case where the instruction (command) pressure of the secondary pressure Psec (the secondary instruction (command) pressure) as the pulley pressure is controlled will be described. It should be noted that the primary pressure Ppri is changed by controlling the secondary instruction (command) pressure in a manner to provide a predetermined speed change ratio (transmission gear ratio). In addition, a case where the selection lever 50 is switched from the N range to the D range will be exemplified in the following description. However, the similar pulley pressure control is executed in a case where the selection lever 50 is switched from the P range to the D range and in a case where the selection lever 50 is switched from the N range or the P range to the R range.

First, the pulley pressure control in a case where the ordinary selection control is selected will be described. In this case, the secondary instruction (command) pressure is controlled to a preset ordinary instruction (command) pressure (hereinafter simply referred to as an ordinary secondary pressure Psec_us). A magnitude of the ordinary secondary pressure Psec_us is preset to such a degree that the belt slippage does not occur due to the torque that is transmitted to the belt 43 during the engagement of the forward clutch 32 through the ordinary selection control and the ordinary secondary pressure Psec_us has a constant value herein.

Next, the pulley pressure control in a case where the pseudo D selection control is selected will be described. In this case, the secondary instruction (command) pressure is controlled to a higher hydraulic pressure of the above-described ordinary secondary pressure Psec_us and a minimum pressure Psec_low. This minimum pressure Psec_low is the secondary pressure Psec that is minimally required to suppress the belt slippage during the engagement of the forward clutch 32 through the pseudo D selection control and is set in accordance with the control mode of the pseudo D selection control.

In the pseudo D selection control, the INH signal is first switched from the N range to the D range, which is followed by the displacement of the manual valve 57. The clutch instruction (command) pressure that is instructed (commanded) to the clutch pressure regulator 14 is gradually increased from time at which the INH signal is switched and the clutch source pressure (the hydraulic pressure that is held in the oil passage on the clutch pressure regulator 14 side than the manual valve 57) is also accordingly increased. When the manual valve 57 is switched to be in the communication state with the oil passage that leads to the forward clutch piston chamber 32a in this state, the high clutch source pressure is supplied to the forward clutch piston chamber 32a. The forward clutch pressure Pfc is, then, rapidly increased, and the forward clutch 32 is rapidly engaged.

In this way, a larger torque than that during the engagement of the forward clutch 32 through the ordinary selection control is instantaneously inputted to the belt 43. Accordingly, the ordinary secondary pressure Psec_us becomes insufficient for the pulley pressure and there is a possibility that the belt slippage occurs. In view of this, in the pulley pressure control in a case where the pseudo D selection control is selected, the minimum pressure Psec_low as another control pressure is provided to suppress such a belt slippage and the higher hydraulic pressure of the ordinary secondary pressure Psec_us and the minimum pressure Psec_low is used.

The minimum pressure Psec_low is controlled to zero in the first control mode and is gradually increased at the same time when the control mode is switched to the second control mode. In the second control mode, the minimum pressure Psec_low is increased in the ramp shape. After the minimum pressure Psec_low reaches a first predetermined pressure P1 that is slightly higher than the ordinary secondary pressure Psec_us, the first predetermined pressure P1 is maintained until the second control mode is terminated. In this way, the secondary instruction (command) pressure is controlled to the ordinary secondary pressure Psec_us in the first control mode, and the secondary instruction (command) pressure is switched from the ordinary secondary pressure Psec_us to the minimum pressure Psec_low in a midway of the control mode, in the second control mode.

The minimum pressure Psec_low is increased again in the ramp shape from a time point at which the control mode is switched to the third control mode and is increased to second predetermined pressure P2 that is higher than the first predetermined pressure P1. Then, after reaching the second predetermined pressure P2, the second predetermined pressure P2 is maintained until the third control mode is terminated. In this way, the secondary instruction (command) pressure is controlled to the minimum pressure Psec_low in the third control mode. When the control mode is switched from the third control mode to the fourth control mode, the minimum pressure Psec_low is lowered to zero in the ramp shape. The secondary instruction (command) pressure is switched from the minimum pressure Psec_low to the ordinary secondary pressure Psec_us at a time point at which the minimum pressure Psec_low falls below the ordinary secondary pressure Psec_us.

The first predetermined pressure P1 and the second predetermined pressure P2 are each the secondary pressure Psec that is minimally required to suppress the belt slippage during the engagement of the forward clutch 32 in the second control mode and the third control mode and are preset. That is, the secondary instruction (command) pressure is increased by the predetermined quantities P1, P2 to the hydraulic pressure at which the belt slippage does not occur even when the forward clutch 32 is engaged in any of the control modes. Since the clutch instruction (command)

pressure is higher in the third control mode than in the second control mode, the torque input during the engagement of the forward clutch 32 is larger in the third control mode. Thus, the second predetermined pressure P2 is set to be higher than the first predetermined pressure P1.

[3. Control Configuration]

As shown in FIG. 1, the controller 60 is provided with a determination section 60*a*, a selection control section 60*b*, and a pulley pressure control section 60*c* as elements for executing the above-described control. Each of these elements may be realized by an electronic circuit (a hardware) or may be programmed as a software. Alternatively, some of functions of these may be provided as the hardware, and the rest thereof may be provided as the software.

The determination section (determination means) 60*a* determines the engagement states of the clutches 32, 33 after the INH signal is switched from the non-travel range to the travel range. Here, the engagement states are determined by using the turbine rotational speed Nt that is detected by the turbine rotational speed sensor 67. Since the drive wheel 80 is stopped at a time point at which the INH signal is switched from the non-travel range to the travel range, the turbine rotational speed Nt is decreased due to a brake action along with progress of the engagement of the clutches 32, 33. Accordingly, the turbine rotational speed Nt is compared with preset predetermined thresholds N1, N2.

More specifically, the determination section 60*a* determines whether the following (A) is established after the INH signal is switched from the non-travel range to the travel range, and further determines whether the following (B) is established when determining that (A) is established.

(A) The turbine rotational speed Nt is equal to or below the engagement start determination threshold N1 (Nt≤N1).

(B) The turbine rotational speed Nt is equal to or below the engagement completion determination threshold N2 (Nt≤N2).

The determination section 60*a* determines that the engagement of the clutches 32, 33 is started when determining that the above (A) is established and determines that the clutches 32, 33 are disengaged (released) when determining that (A) is not established. In addition, the determination section 60*a* determines that the engagement of the clutches 32, 33 is completed when determining that the above (B) is established, and determines that the clutches 32, 33 are currently being engaged when determining that (B) is not established. A determination result at the determination section 60*a* is transmitted to the selection control section 60*b*.

The selection control section (selection control means) 60*b* executes the above-described selection control by using the INH signal, the timer, and the determination result that is transmitted from the determination section 60*a*. The selection control section 60*b* detects that the INH signal is switched from the non-travel range to the travel range, and starts the selection control at this switching time point. The control mode at a start of the selection control is the first control mode. The selection control section 60*b* increases the clutch instruction (command) pressure to the pre-charge pressure Ppr from the switching time point of the INH signal, lowers the clutch instruction (command) pressure to the predetermined pressure Pfi at a time point at which the pre-charge time Tpr elapses, and maintains the predetermined pressure Pfi until the control mode is switched to the second control mode.

The selection control section 60*b* selects the ordinary selection control in a case where the determination section 60*a* determines that the engagement of the clutches 32, 33 is started before a time point at which the first predetermined time T1 elapses from a time point at which the first control mode is started. On the other hand, the selection control section 60*b* selects the pseudo D selection control in a case where the determination section 60*a* determines that the clutches 32, 33 are disengaged at the time point at which the first predetermined time T1 elapses from the time point at which the first control mode is started.

When selecting the ordinary selection control, the selection control section 60*b* executes the control in the second control mode until the determination section 60*a* determines that the engagement of the clutches 32, 33 is completed. That is to say, the clutch instruction (command) pressure is increased from the predetermined pressure Pfi in the ramp shape with a predetermined inclination. Then, when the determination section 60*a* determines that the engagement of the clutches 32, 33 is completed, the control mode is switched to the third control mode, and the clutch instruction (command) pressure is increased in the ramp shape for the predetermined assurance time Tfa. Thereafter, the control mode is switched to the fourth control mode at a time point at which the assurance time Tfa elapses, the clutch instruction (command) pressure is lowered in the ramp shape, and the predetermined hydraulic pressure is maintained.

In addition, when selecting the pseudo D selection control, the selection control section 60*b* executes the control in the second control mode at the time point at which the first predetermined time T1 elapses from the start of the first control mode. That is to say, the clutch instruction (command) pressure is increased in the ramp shape with the predetermined inclination from the predetermined pressure Pfi. Then, the control mode is switched to the third control mode at a time point at which the second predetermined time T2 elapses from a start of the second control mode, and the clutch instruction (command) pressure is increased in the ramp shape.

The selection control section 60*b* switches the control mode from the third control mode to the fourth control mode at a time point at which the third predetermined time T3 elapses from the time point at which the determination section 60*a* determines that the engagement of the clutches 32, 33 is completed, lowers the clutch instruction (command) pressure in the ramp shape, and maintains the predetermined hydraulic pressure. It should be noted that, in a case where the determination section 60*a* determines that the engagement of the clutches 32, 33 is completed during the execution of second control mode, the selection control section 60*b* switches from the second control mode of the pseudo D selection control to the second control mode of the ordinary selection control.

Contents of the control in the selection control section 60*b* are transmitted to the pulley pressure control section 60*c*. That is to say, that the selection control has been executed, a type of the executed selection control (the ordinary selection control or the pseudo D selection control), and the control mode in a case of the pseudo D selection control are transmitted to the pulley pressure control section 60*c*.

The pulley pressure control section (pulley pressure control means) 60*c* executes the above-described pulley pressure control in accordance with the selection control by the selection control section 60*b*. The pulley pressure control section 60*c* starts the pulley pressure control when the selection control is started by the selection control section 60*b*. At this time, in a case where the ordinary selection control is selected by the selection control section 60*b*, the secondary instruction (command) pressure is controlled to the preset ordinary secondary pressure Psec_us.

On the other hand, in a case where the pseudo D selection control is selected by the selection control section 60b, the minimum pressure Psec_low is controlled in accordance with the control mode and the secondary instruction (command) pressure is controlled to the higher hydraulic pressure of the ordinary secondary pressure Psec_us, which is calculated on a basis of the input torque and a pulley ratio, and the minimum pressure Psec_low.

The pulley pressure control section 60c controls the minimum pressure Psec_low to zero in the first control mode. In the second control mode, the minimum pressure Psec_low is increased in the ramp shape and is maintained to be constant at the first predetermined pressure P1 after reaching the first predetermined pressure P1. In the third control mode, the minimum pressure Psec_low is increased in the ramp shape and is maintained to be constant at the second predetermined pressure P2 after reaching the second predetermined pressure P2. Just as described, the pulley pressure control section 60c increases the minimum pressure Psec_low in accordance with a degree of progress of the pseudo D selection control by the selection control section 60b and thereby increases the secondary instruction (command) pressure.

The pulley pressure control section 60c lowers the minimum pressure Psec_low in the ramp shape in the fourth control mode and maintains the minimum pressure Psec_low to be constant at zero after reaching zero.

[4. Flowchart]

Next, an example of a procedure of the pulley pressure control that is executed by the controller 60 will be described by using FIG. 3 with attention being paid to the pseudo D selection control. This flowchart is repeatedly executed at a predetermined calculation interval from a time point at which the selection control is started by the selection control section 60b.

Figure 3:
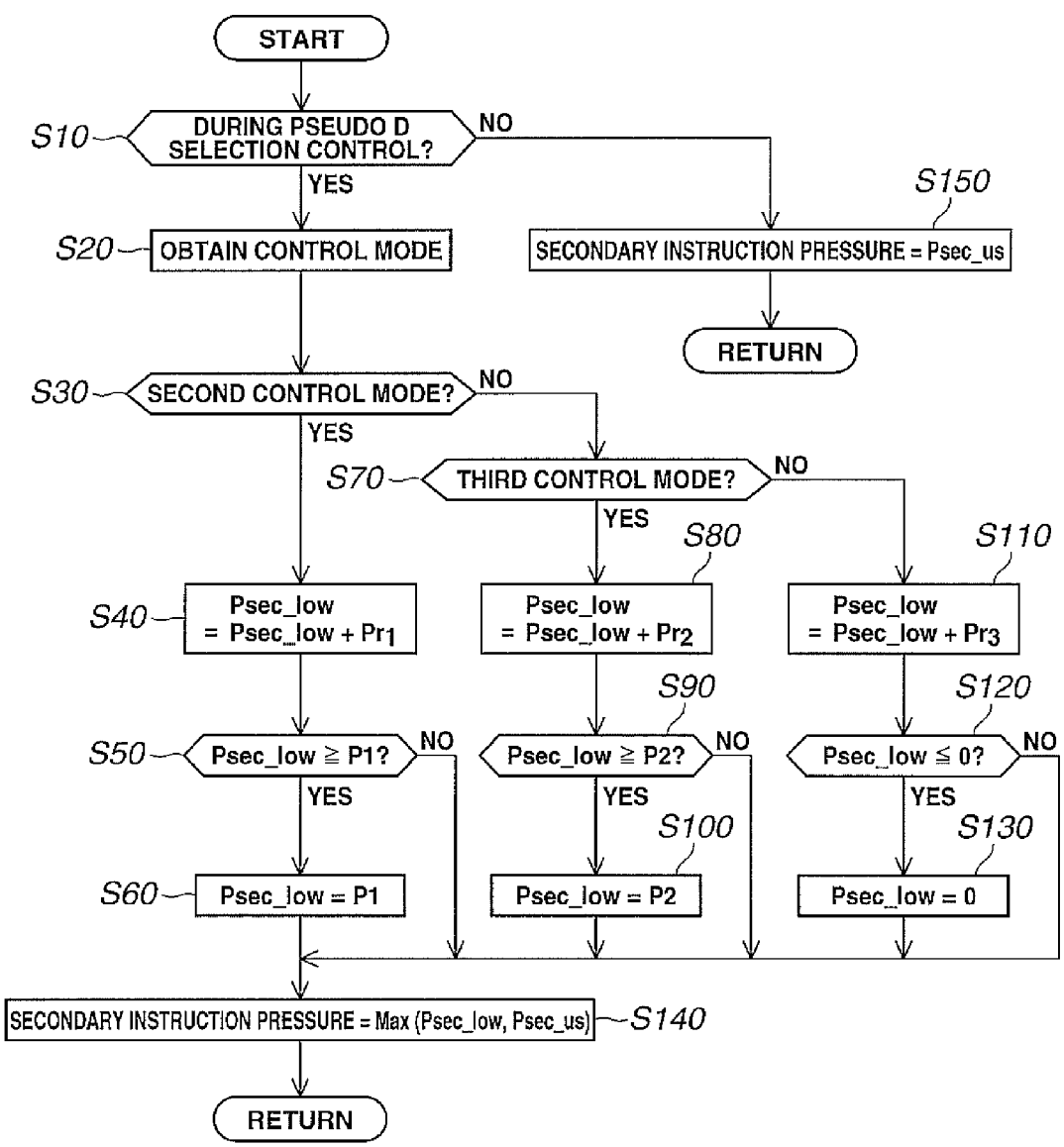
FIG. 3 is an example of a flowchart of a pulley pressure control which is executed in a case where a selection control is started in the control apparatus for the continuously variable transmission according to the one embodiment.

As shown in FIG. 3, controller 60 determines in a step S10 whether the pseudo D selection control is being executed in the selection control section 60b. It should be noted that whether the ordinary selection control or the pseudo D selection control is selected is not indicated in this flow; however, if a condition to select the pseudo D selection control is established (a condition for the ordinary selection control is not established) after the first predetermined time T1 elapses from the start of the control, the pseudo D selection control is selected from this time point, and if the condition to select the pseudo D selection control is not established, the ordinary selection control is selected.

If neither the ordinary selection control nor the pseudo D selection control is yet selected or if the ordinary selection control is being executed, the process proceeds to a step S150, the secondary instruction (command) pressure is controlled to the ordinary secondary pressure Psec_us, and this calculation interval is returned. That is, at a start of this flow, the process proceeds from step S10 to step S150, and the secondary instruction (command) pressure is controlled to the ordinary secondary pressure Psec_us. Then, if the ordinary selection control is selected in a period from the start of the flow (the start of the selection control) until the first predetermined time T1 elapses, the secondary instruction (command) pressure is constantly controlled to the ordinary secondary pressure Psec_us.

On the other hand, if the ordinary selection control is not selected in the period from the start of the flow until the first predetermined time T1 elapses, the pseudo D selection control is selected at the time point at which the first predetermined time T1 elapses, and the process proceeds to a step S20. At this time, the first control mode of the pseudo D selection control has already been terminated. That is to say, since the minimum pressure Psec_low is set to zero in the first control mode, the secondary instruction (command) pressure is controlled to the ordinary secondary pressure Psec_us at the step S150 without exception.

If the controller 60 determines in the step S10 that the pseudo D selection control is being executed, the control mode is obtained in the step S20. At the next step S30, the controller 60 determines whether the control mode is the second control mode. In a case of the second control mode, the process proceeds to a step S40. It should be noted that the second control mode is selected at the start of the pseudo D selection control. At the step S40, a pressure that is obtained by adding a first ramp pressure $Pr_1$ to the minimum pressure Psec_low in a previous interval is set as a new minimum pressure Psec_low.

The controller 60 determines, at the following step S50, whether the minimum pressure Psec_low is equal to or above the first predetermined pressure P1. If the minimum pressure Psec_low is lower than the first predetermined pressure P1, the process proceeds to a step S140. At the step S140, the higher hydraulic pressure of the minimum pressure Psec_low and the ordinary secondary pressure Psec_us is set to the secondary instruction (command) pressure and this calculation interval is returned. As long as the second control mode of the pseudo D selection control is continued, the first ramp pressure $Pr_1$ is added to the minimum pressure Psec_low at the step S40 and the minimum pressure Psec_low is increased in the ramp shape. Then, when the minimum pressure Psec_low becomes equal to or above the first predetermined pressure P1, the process proceeds from the step S50 to a step S60. At the step S60, the minimum pressure Psec_low is set to the first predetermined pressure P1 and the process proceeds to the step S140.

If the second predetermined time T2 elapses from the start of the second control mode and the control mode of the pseudo D selection control is switched to the third control mode, the process proceeds from the step S30 to a step S70 and the controller 60 determines whether the control mode of the pseudo D selection control is in the third control mode. Since it is in the third control mode, in this case, the process proceeds from the step S70 to a step S80 and, at the step S80, the pressure that is obtained by adding a second ramp pressure $Pr_2$ to the minimum pressure Psec_low in the previous interval is set to the new minimum pressure Psec_low. At the following step S90, it is determined whether the minimum pressure Psec_low is equal to or above the second predetermined pressure P2. If the minimum pressure Psec_low is lower than the second predetermined pressure P2, the process proceeds to the step S140.

As long as the third control mode of the pseudo D selection control is continued, the second ramp pressure $Pr_2$ is added to the minimum pressure Psec_low at the step S80 and the minimum pressure Psec_low is increased in the ramp shape. Then, when the minimum pressure Psec_low becomes equal to or above the second predetermined pressure P2, the process proceeds from the step S90 to a step S100, at the step S100, the minimum pressure Psec_low is set to the second predetermined pressure P2, and the process proceeds to the step S140. It should be noted that, in a case of this third control mode, the minimum pressure Psec_low is set to the secondary instruction (command) pressure at the step S140.

If the third predetermined time T3 elapses from a time point at which the deviation between the turbine rotational speed Nt and the engine speed Ne becomes equal to or above the predetermined rotation speed and the control mode of the pseudo D selection control is switched to the fourth control mode, the process proceeds from the step S70 to a step S110. Then, the pressure that is obtained by subtracting third ramp pressure $Pr_3$ from the minimum pressure Psec_low at the previous interval is set as the new minimum pressure Psec_low. At the following step S120, the controller 60 determines whether the minimum pressure Psec_low is equal to or below zero, and, if Psec_low is higher than zero, the process proceeds from the step S120 to the step S140. In addition, if the minimum pressure Psec_low becomes equal to or below zero, the minimum pressure Psec_low is set to zero at a step S130, and the process proceeds to the step S140. Then, when the fourth control mode is terminated, this flow is terminated.

[5. Action]

Next, a relationship between the selection control and the pulley pressure control according to this control apparatus will be described using FIG. 4 and FIG. 5. It should be noted that, since the selection control has been described above, the pulley pressure control will mainly be described. FIG. 4 is the timing chart in a case where the INH signal matches (is coincident with) the communication state of the manual valve 57 (the ordinary selection control), and FIG. 5 is the timing chart in a case where the INH signal does not match (coincident with) the communication state of the manual valve 57 (the pseudo D selection control).

As shown in FIGS. 4(a), (b), in a case where the INH signal matches (is coincident with) the communication state of the manual valve 57, as shown in FIG. 4(c), the actual pressure of the clutch pressure (a broken line) is promptly increased due to the pre-charge and is controlled to the hydraulic pressure that is substantially the same as the clutch instruction (command) pressure. As shown in FIG. 4(e), the transmission torque of the clutches 32, 33 (a solid line) is increased along the actual clutch pressure (a torque capacity) until the time $t_4$ at which the clutches 32, 33 are completely engaged, is lowered to a predetermined torque at the time $t_4$, and, thereafter, gives a constant value. It should be noted that, as shown in FIG. 4(f), the secondary instruction (command) pressure (the pulley pressure) becomes constant at the ordinary secondary pressure Psec_us, in the ordinary selection control.

On the other hand, as shown in FIGS. 5(a), (b), in a case where the INH signal does not match (is not coincident with) the communication state of the manual valve 57, as shown in FIG. 5(c), the actual pressure of the clutch pressure (a broken line) does not change even when the clutch instruction (command) pressure is controlled in the first control mode and in the second control mode. In this way, as shown in FIGS. 5(d), (e), the turbine rotational speed Nt does not change, either, and the transmission torque becomes constant at zero.

However, in the second control mode, as shown in FIG. 5(f), the minimum pressure Psec_low is increased in the ramp shape to the first predetermined pressure P1 and becomes constant at the first predetermined pressure P1. In this way, the slippage of the belt 43 is prevented even when the clutches 32, 33 are engaged during the second control mode. When the control mode of the pseudo D selection control is switched to the third control mode, the clutch instruction (command) pressure is further increased.

Here, it is assumed that the manual valve 57 is displaced at a time $t_8$ during the third control mode and matches (coincident with) the INH signal. Accordingly, the actual clutch pressure starts being increased, and is rapidly increased to the clutch instruction (command) pressure at once from a time $t_9$ at which the actual clutch pressure reaches the torque 0 point hydraulic pressure. In conjunction with this, the turbine rotational speed Nt is lowered at once from the time $t_9$, and the deviation between the turbine rotational speed Nt and the engine speed Ne becomes equal to or above the predetermined rotation speed at the time $t_{10}$. That is to say, the clutches 32, 33 are completely engaged at the time $t_{10}$).

Such a rapid engagement of the clutches 32, 33 as described above leads to a rapid increase in the transmission torque as shown in FIG. 5(e). At this time, if the pulley pressure is controlled as shown in FIG. 4(f), there is a possibility that the belt slippage occurs due to the rapid increase in the transmission torque. On the other hand, in this control apparatus, as shown in FIG. 5(f), the secondary instruction (command) pressure is increased to the second predetermined pressure P2 after the third control mode of the pseudo D selection control is started. Thus, even in a case where the clutches 32, 33 are rapidly engaged, the belt slippage is prevented. Furthermore, the minimum pressure Psec_low is lowered again to zero from a time $t_{11}$ at which the control mode is switched to the fourth control mode and a load on the oil pump 10 is reduced.

[6. Effects]

Accordingly, according to the control apparatus for the continuously variable transmission in this embodiment, the secondary instruction (command) pressure (the pulley pressure) is increased in a case where the clutches 32, 33 are disengaged (released) even after the first predetermined time T1 elapses from the start of the selection control. Thus, the belt slippage that is caused by the rapid engagement of the clutches 32, 33 can be suppressed. In addition, the secondary instruction (command) pressure is lowered when the clutches 32, 33 are engaged. Thus, the load on the oil pump 10 can be reduced. Accordingly, in a case where the oil pump 10 uses the engine 70 as the drive source, the fuel economy (consumption) performance can be enhanced by reducing the load on the oil pump 10.

In addition, the pulley pressure control section 60c increases the secondary instruction (command) pressure in accordance with the degree of the progress of the selection control of the selection control section 60b. That is to say, the secondary instruction (command) pressure is increased to the first predetermined pressure P1 in the second control mode, in accordance with the control mode of the pseudo D selection control, and the secondary instruction (command) pressure is increased to the second predetermined pressure P2 in the third control mode. The clutch instruction (command) pressure is gradually increased from the time point at which the first predetermined time T1 elapses from the start of the selection control (that is, the time point at which the control mode is switched to the second control mode). Thus, by increasing the secondary instruction (command) pressure in accordance with the degree of progress of the selection control, the load on the oil pump 10 can further be reduced while the belt slippage during the engagement of the clutches is suppressed.

Furthermore, when raising the secondary instruction (command) pressure, the pulley pressure control section 60c increases the secondary instruction (command) pressure to the hydraulic pressure at which the belt slippage does not occur during the engagement of the clutches. Thus, the load on the oil pump 10 can be suppressed to a minimally required load while the belt slippage is suppressed.

In addition, since the determination section 60a determines the engagement states of the clutches 32, 33 by using the turbine rotational speed Nt, the engagement states of the clutches 32, 33 can accurately and easily be determined.

It should be noted that the control mode is switched by using the timer, in the pseudo D selection control. Thus, a control configuration can be simplified. In addition, the pulley pressure control section 60c increases the secondary instruction (command) pressure to the second predetermined pressure P2 in a case where the clutches 32, 33 are engaged in either mode of the second control mode and the third control mode. That is to say, since the similar control logic is used, the control configuration can be simplified. Furthermore, according to this control apparatus, even in a case where the selection lever 50 is slowly operated and the accelerator pedal is depressed after the pseudo D state, the belt slippage can be suppressed since the pulley pressure is controlled and a startability can also be secured.

[7. Others]

The embodiment according to the present invention has, hereinabove, been described. However, the present invention is not limited to the above-described embodiment, but the present invention can be implemented by making various modifications thereto within a scope that does not depart from the gist of the present invention.

In the above-described embodiment, a case where the secondary pressure Psec is controlled, as the pulley pressure, is exemplified. However, the primary pressure Ppri may be controlled. In addition, in a case where the pulley pressure is increased, the pulley pressure may be increased not in the ramp shape but in a stepwise manner, or in place of the increase in two stages of the first predetermined pressure P1 and the second predetermined pressure P2, the pulley pressure may be increased in the ramp shape to the second predetermined pressure P2 with a predetermined inclination from the time $t_6$ in FIG. 5(f), for example. In addition, the timing at which the pulley pressure is lowered is not limited to the timing that has been described above. That is to say, the pulley pressure may be lowered at the timing immediately after the engagement of the clutches 32, 33.

In addition, in the above-described embodiment, in a case where the pseudo D selection control is selected, the minimum pressure Psec_low is controlled in accordance with the control mode of the selection control and the higher oil pressure of the ordinary secondary pressure Psec_us and the minimum pressure Psec_low is set to the secondary instruction (command) pressure. However, a control method for the secondary instruction (command) pressure (the pulley pressure) is not limited to this. For example, only the minimum pressure Psec_low is provided without providing the control pressure called the ordinary secondary pressure Psec_us, and this minimum pressure Psec_low is set as the secondary instruction (command) pressure. In this case, such a configuration that the minimum pressure Psec_low is set as the hydraulic pressure that is equivalent to the ordinary secondary pressure Psec_us, in the first control mode, and is set as the first predetermined pressure P1, in the second control mode, by increasing this hydraulic pressure by a predetermined quantity may be adopted.

It should be noted that the contents of the selection control by the selection control section 60b are not limited to those that have been described above and contents of the control of the clutch pressure in each of the control modes may be other than those that have been described above. In addition, another control mode may be provided.

Furthermore, the method for determining the engagement states of the clutches 32, 33 is not limited to the embodiment that has been described above. In addition, a component that detects the operation position of the selection lever 50 is not limited to the inhibitor switch 65 but may be a detector, such as an AT shift position sensor, that can detect the operation position of the selection lever 50 and can output an electrical signal.

Furthermore, the oil pump is not limited to the oil pump that uses the engine 70 as the drive source.

The invention claimed is:

1. A control apparatus for a continuously variable transmission, the continuously variable transmission including a continuously variable transmission mechanism having a belt wound around two pulleys; and a clutch interposed between the continuously variable transmission mechanism and an engine, the control apparatus comprising:
   an inhibitor switch structured to detect an operation position of a selection lever; and
   a controller programmed to:
      execute a selection control for engaging the clutch from a time point at which switching from a non-travel range to a travel range is detected by the inhibitor switch;
      determine an engagement state of the clutch;
      control a pulley pressure supplied to the two pulleys, and
   increase the pulley pressure in a case where the controller determines that the clutch is released at a time point at which a predetermined time elapses from a start of the selection control by the controller and lower the pulley pressure thereafter in response to the controller determining that the clutch is engaged.

2. The control apparatus for the continuously variable transmission as claimed in claim 1, wherein the controller is programmed to increase the pulley pressure in accordance with a degree of progress of the selection control by the controller.

3. The control apparatus for the continuously variable transmission as claimed in claim 1, wherein, when increasing the pulley pressure, the controller is programmed to increase the pulley pressure by a predetermined quantity to a hydraulic pressure at which a slippage of the belt does not occur during an engagement of the clutch.

4. The control apparatus for the continuously variable transmission as claimed in claim 1, wherein the controller is programmed to determine the engagement state of the clutch by using a turbine rotational speed of a torque converter that is interposed between the clutch and the engine.

* * * * *